United States Patent
Merkel

(10) Patent No.: US 8,882,460 B2
(45) Date of Patent: Nov. 11, 2014

(54) METHOD FOR OPERATING A VARIABLE-SPEED WIND TURBINE AND THE WIND TURBINE

(75) Inventor: Maximillian Merkel, Hamburg (DE)

(73) Assignee: Nordex Energy GmbH, Norderstedt (DE)

( * ) Notice: Subject to any disclaimer, the term of this patent is extended or adjusted under 35 U.S.C. 154(b) by 969 days.

(21) Appl. No.: 12/872,306

(22) Filed: Aug. 31, 2010

(65) Prior Publication Data
US 2011/0135470 A1 Jun. 9, 2011

(30) Foreign Application Priority Data
Dec. 4, 2009 (DE) .......................... 10 2009 057 062

(51) Int. Cl.
*F03D 7/02* (2006.01)
(52) U.S. Cl.
CPC ............. *F03D 7/0244* (2013.01); *Y02E 10/723* (2013.01); *F05B 2270/327* (2013.01); *F05B 2270/1074* (2013.01); *F05B 2270/1011* (2013.01); *F05B 2260/70* (2013.01); *F05B 2260/90* (2013.01)
USPC ................................................ 416/1; 416/44
(58) Field of Classification Search
USPC ............. 416/31, 40, 41, 44, 1; 415/13, 30, 33
See application file for complete search history.

(56) References Cited

U.S. PATENT DOCUMENTS

| | | | | |
|---|---|---|---|---|
| 5,019,006 A | * | 5/1991 | Schneider et al. | 416/35 |
| 6,840,734 B2 | * | 1/2005 | Hansen | 415/1 |
| 7,400,054 B2 | * | 7/2008 | Wesselink | 290/44 |
| 7,586,205 B2 | * | 9/2009 | Krueger | 290/44 |
| 7,939,955 B2 | * | 5/2011 | Steiner et al. | 290/44 |
| 7,942,629 B2 | * | 5/2011 | Shi et al. | 415/119 |
| 8,210,811 B2 | * | 7/2012 | Loh et al. | 416/1 |
| 2009/0224543 A1 | * | 9/2009 | Steudel et al. | 290/44 |
| 2009/0295161 A1 | * | 12/2009 | Steiner et al. | 290/44 |
| 2010/0013227 A1 | * | 1/2010 | Weitkamp | 290/44 |
| 2010/0140937 A1 | * | 6/2010 | Kirchner et al. | 290/44 |
| 2011/0135470 A1 | * | 6/2011 | Merkel | 416/1 |

FOREIGN PATENT DOCUMENTS

| | | | |
|---|---|---|---|
| DE | 202005014265 | 12/2005 | |
| DE | 102006001613 | 7/2007 | |
| DE | 102006034251 | 1/2008 | |
| DE | 10 2005 021 926 C5 | 11/2008 | |
| WO | WO 2007082642 A1 * | 7/2007 | ............... F03D 7/02 |
| WO | 2010/135552 | 11/2010 | |

OTHER PUBLICATIONS

Machine translation of WO 2007082642 A1 from Espacenet.*
Machine translation of WO 2007082642 A1 from EPO.*

* cited by examiner

*Primary Examiner* — Edward Look
*Assistant Examiner* — Christopher R Legendre
(74) *Attorney, Agent, or Firm* — Vidas, Arrett & Steinkraus

(57) ABSTRACT

A method for operating a wind turbine with a variable speed rotor, a control system and a safety system, including the steps of initiating a braking procedure of the rotor of the wind turbine by the control system when the rotational speed of the rotor exceeds a first threshold value ($n_{c1}$), and activating a safety system for braking the rotor when the rotational speed of the rotor exceeds a second threshold value ($n_{s1}$) and when the control system has not initiated a braking procedure, the second threshold value ($n_{s1}$) being greater than the first threshold value ($n_{c1}$).

15 Claims, 4 Drawing Sheets

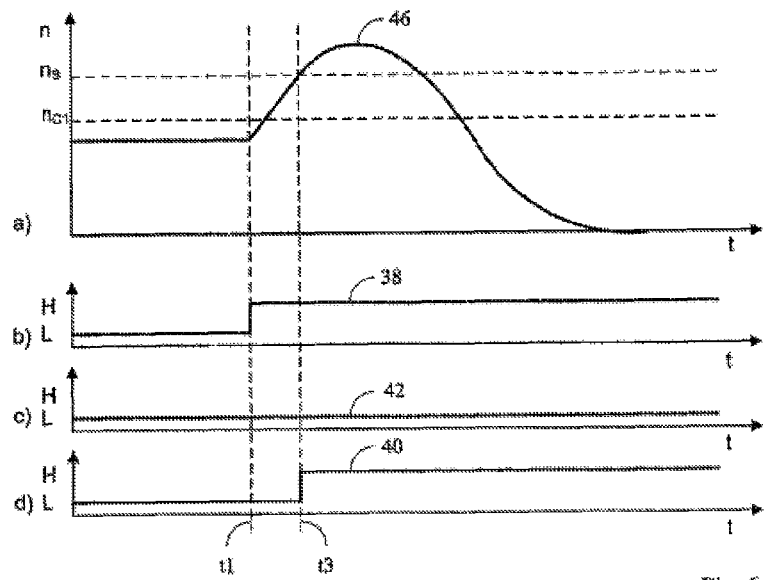
Prior Art  Fig. 6
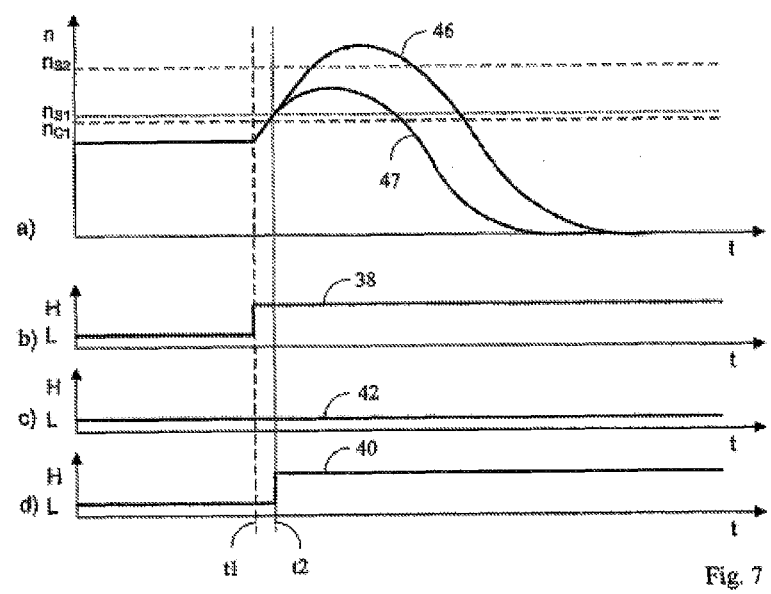
Fig. 7

METHOD FOR OPERATING A VARIABLE-SPEED WIND TURBINE AND THE WIND TURBINE

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to a method for operating a wind turbine with a variable-speed rotor, a control system and a safety system, as well as to such a wind turbine.

The "guideline for the certification of wind turbines" of "Germanischer Lloyd" GL Wind 2003, part 1, chapter 2 (2.2 control system and safety system), the entire contents of which are hereby incorporated by reference, defines requirements that have to be met by a control system and a safety system of a variable-speed wind turbine. For instance, it is said in the guideline that it is the task of the control system to operate the wind turbine efficiently, as free of faults and free of loads as possible, and safely. In this, the logic of the method is transferred into a closed or open loop control that works in the control system. Concerning the safety system, it is defined that the same is a system that has logical priority over the control system which reacts after safety-related limiting values have been exceeded or if the control system is not capable to keep the plant in its normal operating range. Regarding the rotational speed of the rotor, the GL guideline defines a minimum operating speed $n_1$ and a maximum operating speed $n_3$, between which the rotational speed should be under normal operating conditions. Additionally a cut-out speed $n_4$ is defined; this is the rotational speed which necessitates immediate cut-out of the wind turbine by the control system. The cut-out speed $n_4$ must be distinguished from the activation speed $n_a$. This activation speed is the rotational speed at which an immediate activation of the safety system must occur. Regarding this, the guideline further stipulates that the limiting values which activate the safety system have to be defined such that the values on which the construction of the wind turbine is based are not exceeded and the plant is not endangered, but also such that the control system is not unnecessarily disturbed by the safety system under normal operating conditions. Other guidelines, such as IEC 61400, part 1, design requirements (IEC 61400-1: 2005), the entire contents of which are hereby incorporated by reference, stipulate similar safety requirements.

From US 2009 224 543 A1, the entire contents of which is incorporated herein by reference, a method for operating a wind power plant is known. The method knows two operating modes, which are distinguished by a different braking behaviour of the wind power plant. In a first operating mode, a braking process of the rotor is initiated when a rotational speed of the rotor is exceeded, which lies above a first rotational speed threshold value. In a second operating mode, the braking process is initiated when a second rotational speed threshold value that is smaller than the rotational speed threshold value of the first operating mode is exceeded, and/or when there is a rotor acceleration in the first and/or second operating mode that is greater than a rotor acceleration threshold value.

From US 2009 295 161 A1, the entire contents of which is incorporated herein by reference, a method for operating a wind turbine having a control system and a safety system is known, wherein braking of the rotor occurs by an adjustment of the blade pitch angle with an average adjustment speed of blade pitch of less than 8.5°/s of at least one rotor blade after the occurrence of a fault signal. Braking of the rotor is then performed by a mechanical braking system, as soon as the rotational speed of the rotor exceeds a predefinable first rotational speed limit. The safety system is designed such that it is activated as soon as the rotational speed of the rotor exceeds a predefinable second rotational speed limit, which is greater than the first rotational speed limit. In this, the second rotational speed limit is selected such that the safety system is not activated when the wind turbine is operative, even upon load shedding of the generator combined with an extreme gust having a probability of occurrence of less than once in three months. Further, this document already mentions that the safety system features a safety monitoring that can monitor even the control system with respect to its functionality.

From US 2010 013 227 A1, the entire contents of which is incorporated herein by reference, a wind turbine and a method for operating the same is known, in which a safety system is provided which responds to safety limits being exceeded, or which responds in case that the control system looses control of the wind turbine.

From EP 1 764 664 A2, the entire contents of which is incorporated herein by reference, a safety equipment for wind turbines is known in which the activation of a safety chain is not performed selectively when individual limits are exceeded, but which can combine logically a plurality of fixed limiting values by a protective device in order to activate the safety chain.

From Siegfried Heier, "Grid Integration of Wind Energy Conversion Systems", translated by Rachel Waddington, $2^{nd}$ Edition, John Wiley & Sons, Ltd., the entire contents of which are hereby incorporated by reference, it is known from chapter 5.6.2.3, to keep the rotational speed in the controllable range by adjusting the blade pitch angle upon full load of the wind turbine, i.e. at speeds above the nominal range. A regulation reserve permits delayed reaction to increases of the rotational speed. Nevertheless, in case that the rotational speed increases above the highest admissible operating speed in spite of this, for instance 10% above the nominal value, a fault shut-down is initiated. In case that the rotor rotates too rapidly in spite of an intervention of the control system and reaches the activation speed, the safety system must act to limit the rotational speed. An intervention of the safety system leads then immediately to a fault shut-down.

BRIEF SUMMARY OF THE INVENTION

The present invention is based on the objective to provide a wind turbine and a method for operating a wind turbine in which the loads for the wind turbine are decreased and unnecessary activation of the safety system is avoided.

The method of the present invention serves for operating a wind turbine with a variable speed rotor, a control system and a safety system. The method comprises the procedural step to initiate a braking procedure for the rotor of the wind turbine by the control system when the rotational speed of the rotor exceeds a first threshold value ($n_{c1}$). According to the present invention, the safety system initiates the braking of the rotor also when the rotational speed exceeds a second threshold value ($n_{s1}$) and if the control system has not initiated a braking procedure upon the the first threshold value ($n_{c1}$) being exceeded. According to the present invention, the second threshold value ($n_{s1}$) is greater than the first threshold value ($n_{c1}$). The safety system of the present invention makes sure that in case of a malfunction of the control system, braking is initiated by the safety system already at the second threshold value ($n_{s1}$) if a braking procedure was not initiated correctly by the control system. As the safety system is activated at this second threshold value only if no braking procedure had been initiated by the control system, this second threshold value may be selected to be lower than conventional threshold values for the safety system. The particular advantage of the safety system according to the present invention is to make sure that braking the rotor of the wind turbine occurs in any case for rotational speeds above the second threshold value ($n_{s1}$). Thus, for dimensioning the wind turbine the second threshold value ($n_{s1}$) can be assumed as that threshold value for which it is made sure that braking will be initiated. Because this threshold value is smaller than a conventional threshold value, loads for the wind turbine can be reduced and it may be designed more cost-saving without creating a risk through this.

In a preferred embodiment of the method of the present invention, activation of the safety system takes place irrespective of whether the control system has already initiated a braking procedure or not, when the rotational speed of the rotor exceeds a third threshold value ($n_{s2}$). The third threshold value ($n_{s2}$) is greater than the second threshold value ($n_{s1}$), and thus also greater than the first threshold value ($n_{c1}$). The advantage to provide a further threshold value for the safety system is that the safety system reliably detects in any case whether a particular condition with high rotational speeds has occurred in the wind turbine. Even if the braking procedure was initiated by the control system, the safety system detects the occurrence of rotational speeds that are greater than the third threshold value ($n_{s2}$).

In a preferred embodiment, the control system and the safety system for braking the rotor trigger the blade pitch angle of at least one rotor blade. In doing so, the blade pitch angle is adjusted such that the torque taken up from the wind is reduced and thus the rotational speed is reduced, preferably to the standstill. Alternatively or in addition, electric or hydraulic brakes may be utilised in the wind turbine, in order to reduce the rotational speed of the rotor.

In a practical embodiment, after an activation of the safety system, the wind turbine has to be checked for any damages that may have occurred before the operation of the wind turbine is started again. The wind turbine can be started again only after check has been performed, wherein the check can be done by a service technician on the site or by a suitable remote inspection.

The wind turbine of the present invention has a variable speed rotor, a control system and a safety system. A first threshold value ($n_{c1}$) of the rotational speed of the rotor is defined for the control system, upon which being exceeded the control system initiates a braking procedure. A second threshold value ($n_{s1}$) is defined for the safety system, upon which being exceeded the safety system initiates braking of the rotor if the control system has not initiated any braking of the rotor. In case that the safety system detects upon the second threshold value ($n_{s1}$) being exceeded that the control system has already initiated a braking procedure, the braking procedure is not initiated by the safety system. As already explained for the method of the present invention, it is made sure in the wind turbine that the braking procedure takes place upon the second threshold value ($n_{s1}$) being exceeded, either by the control system at the first threshold value ($n_{c1}$) or by the safety system at the second threshold value ($n_{s1}$). Thus, the wind turbine of the present invention can be designed for the rotational speed of the second threshold value ($n_{s1}$), the second threshold value ($n_{s1}$) then defining the load case from which the braking procedure is initiated even in case of a malfunctioning of the control system.

In a preferred embodiment, a third threshold value ($n_{s2}$) is defined for the safety system in addition, upon which being exceeded the safety system initiates a braking of the rotor, the third threshold value ($n_{s2}$) being greater than the second threshold value ($n_{s1}$) and thus also than the first threshold value ($n_{c1}$). As already explained for the method of the present invention, there is an unconditional activation of the safety system upon the third threshold value ($n_{s2}$) being exceeded, whereas according to the present invention, there is a conditional activation of the safety system upon the second threshold value ($n_{s1}$) being exceeded in case that the control system has not initiated the braking procedure.

In a preferred embodiment, an open and/or closed loop control system (a second control system) is provided for braking the rotor which is bidirectionally connected to the safety system, wherein the open and/or closed loop control system receives a braking signal from the activated safety system, and the safety system receives the braking signal from the open and/or closed loop control system. Through this it is made sure that a braking signal applied to the open and/or closed loop control system is always applied to the safety system too. In an alternative, also preferred embodiment, the control system is connected to the safety system, and applies a braking signal for the open and/or closed loop control system always also to the safety system.

The open and/or closed loop control system preferably features a blade pitch control system which adjusts the blade pitch angle of at least one rotor blade.

BRIEF DESCRIPTION OF THE SEVERAL VIEWS OF THE DRAWINGS

The present invention will be explained in more detail in the following by way of some examples of its realisation.

FIG. 6 shows the rotational speed plotted against time according to the state of the art when a malfunction occurs in the control system that leads to an increase of the rotational speed, and the safety system initiates the braking;

FIG. 7 shows the rotational speed plotted against time when a malfunction occurs in the control system that leads to an increase of the rotational speed and the safety system initiates the braking according to the present invention.

DETAILED DESCRIPTION OF THE INVENTION

While this invention may be embodied in many different forms, there is described in detail herein a specific preferred embodiment of the invention. This description is an exemplification of the principles of the invention and is not intended to limit the invention to the particular embodiment illustrated.

Figure 1:
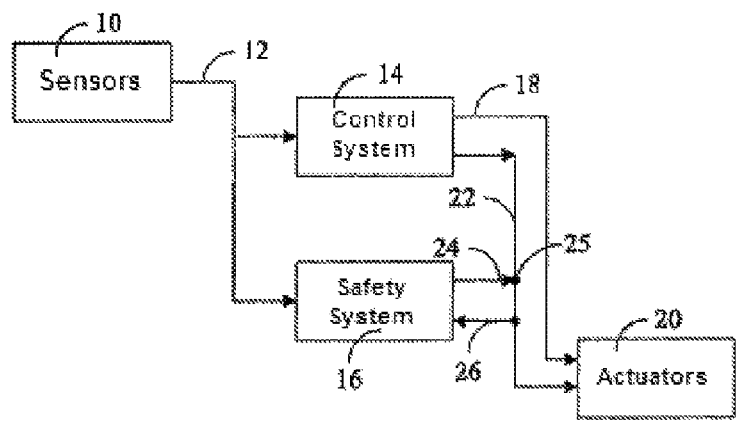
FIG. 1 shows the control system and the safety system of a variable-speed wind turbine according to the present invention, in a schematic block view.

FIG. 1 shows in a schematic block view the structure and the data connections for the control system 14 and the safety system 16. Sensors 10 capture the rotational speed occurring at the rotor shaft. The rotational speed is forwarded to the control system 14 and the safety system 16 via the data line 12. The control system 14 compares the value for the rotational speed that is applied via the data line 12 with a first threshold value $n_{c1}$, which defines the maximum rotational speed for the wind turbine. The control system 14 applies a braking signal for the actuators 20 via a data bus 18. The actuators 20 are a device for the adjustment of the blade pitch angle, by which the rotor blade can be rotated around its longitudinal axis in order to take up more or less torque from the wind. Parallel to the data bus 18, a line 22 is provided from the control system 14 to the actuators 20, via which a voltage signal can be given to the actuators 20. The voltage signal applied to the actuators 20 via the line 22 triggers an adjustment of the rotor blade to its feathered position, irrespective of the data that are applied via the data bus 18. The signals are processed within the actuators 20 such that a voltage signal applied via the line 22 has always priority over the data from the data bus 18.

A rotational speed of the rotor shaft measured by the sensors 10 is also applied to the safety system 16 via the data line 12. The safety system 16 compares the rotational speed value with the second threshold value $n_{s1}$ and can compare it also with the third threshold value $n_{s2}$, as will be described in more detail in the following. The safety system 16 triggers a voltage signal, which is applied to the actuators 20 via the connecting line 24 and the line 22, in order to initiate the braking procedure. A further line 26 is provided at the same time, which connects the line 22 with the safety system 16, so that the safety system can detect whether a braking signal has already been applied to the actuators 20 by the control system 14 via the data line 22. The control system 14 and the safety system 16 are directly connected with each other via the lines 22 and 26. From the point 25, the safety system 16 can ensure the braking signal independently from the control system 14 via the signal line 22.

Figure 2:
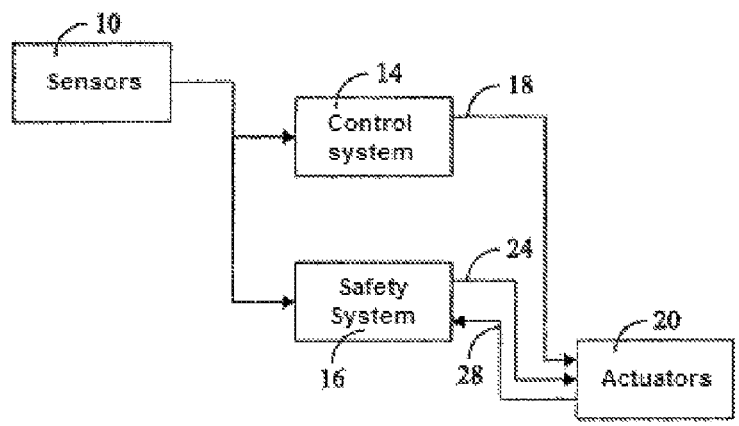
FIG. 2 shows the control system and the safety system of a variable-speed wind turbine in an alternative embodiment, in a schematic block view.

FIG. 2 shows an alternative embodiment of the connection of the control system 14 and the safety system 16 with the actuators 20, wherein the control system 14 and the safety system 16 are connected with each other via the actuators 20. The control system 14 can apply a braking signal to the actuators 20 via a data bus 18. Via its line 24, the safety system 16 can also apply a braking signal to the actuators 20, wherein the signal applied via the safety system 16 and the line 24 has always priority in the actuators 20 over a signal that is applied via the data bus 18. In order to provide the safety system 16 with the information that a braking signal is already applied to the actuators 20, a data line 28 is provided which connects the actuators 20 with the safety system 16.

Figure 3:
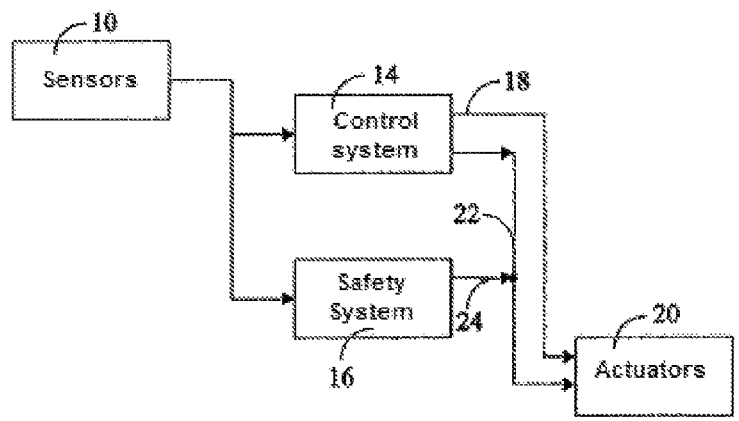
FIG. 3 shows the control system and the safety system of a variable-speed wind turbine of the state of the art, in a schematic block view.

FIG. 3 shows in a schematic view the link of the control system 14 and the safety system 16 that is known in the state of the art. According to this, the control system 14 applies a braking signal to the actuators 20 via the data bus 18. Via the line 22, the control system 14 can apply a voltage signal to the actuators 20 which initiates a braking procedure. The safety system 16 can also apply a voltage signal to the actuators 20 via the connecting line 24, in order to initiate the braking procedure.

The method of the present invention will be explained in more detail in the following by way of FIGS. 4 to 6.

Figure 4:
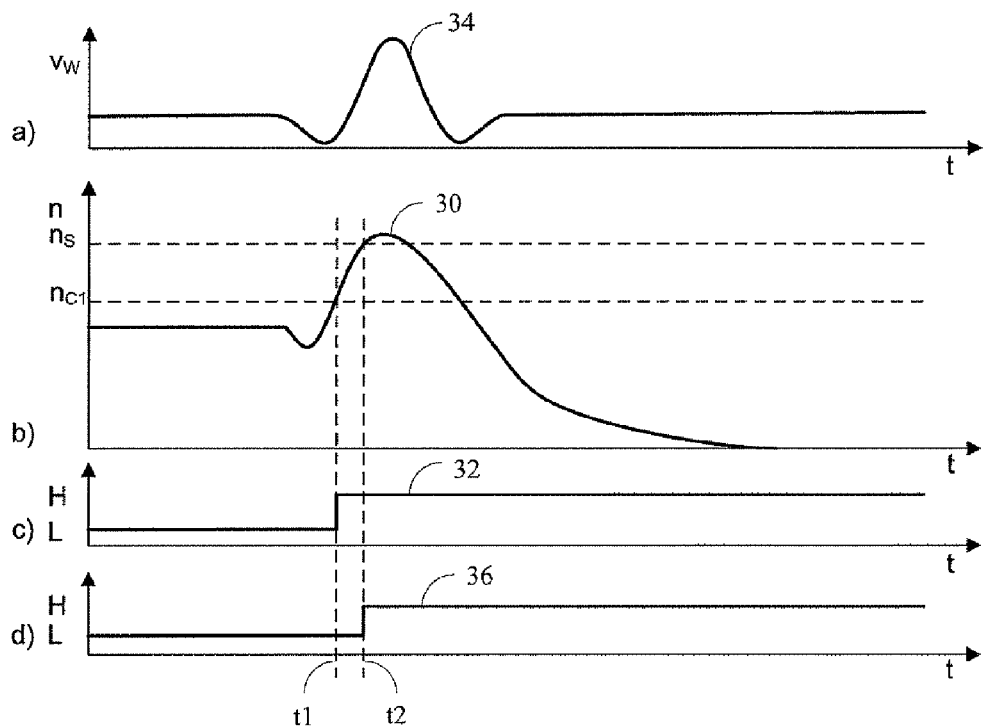
FIG. 4 shows the rotational speed plotted against time at an extreme wind speed with a recurrence period of 50 years, according to the state of the art.

FIG. 4 shows the rotational speed plotted against time, the threshold values $n_s$ and $n_{c1}$ being drawn in by way of example. A conventional method of the state of the art is explained in FIG. 4 by way of the example of an extreme wind speed with a recurrence period of 50 years. In FIG. 4, one recognizes that the rotational speed over time exceeds the threshold value $n_{c1}$ at the time $t_1$. As can be seen from the braking signal 32 of the control system, the control system initiates a braking signal at the time $t_1$. Because the wind speed 34 continues to increase significantly after the time $t_1$, the rotational speed 30 increases beyond a threshold value $n_s$, in spite of the braking procedure having been initiated. The safety system 16 is activated when the threshold value $n_s$ is exceeded at the time $t_2$, which is shown by the braking signal of the safety system 36 in FIG. 4d.

Figure 5:
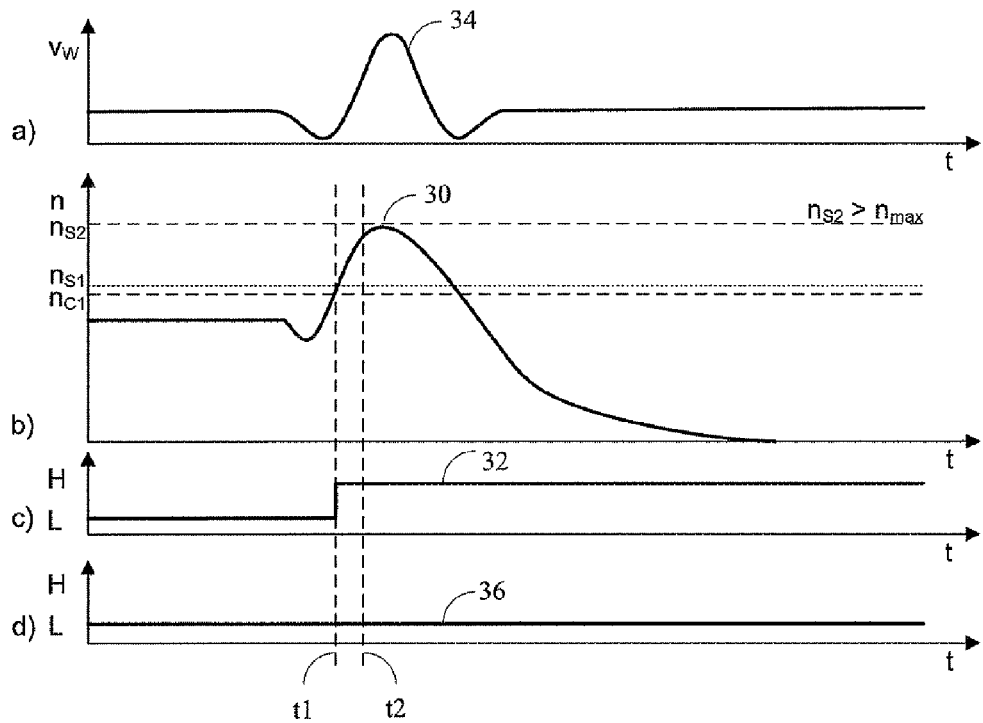
FIG. 5 shows like in FIG. 4 the rotational speed plotted against time at an extreme wind speed with a recurrence period of 50 years when the safety system according to the present invention recognises braking by the control system and is not activated.

FIG. 5 shows the scenario of an extreme wind speed with a recurrence period of 50 years, like that shown in FIG. 4, but with the method of the present invention. The first threshold value $n_a$ in FIG. 5b corresponds to the threshold value $n_{c1}$ in FIG. 4b. The braking procedure is initiated by the control system at the time $t_1$, as can be seen from the curve 32 in FIG. 5c. The rotational speed 30 in FIG. 5b subsequently exceeds the second threshold value $n_{s1}$ of the method of the present invention. At this time, the safety system checks whether the braking procedure has already been initiated. Because the braking procedure has already been initiated at the time $t_1$ in the example shown, there is no activation of the safety system when the second threshold value $n_{s1}$ is exceeded. The rotational speed continues to increase in the example of FIG. 5b and does not reach the third threshold value $n_{s2}$, so that no activation of the safety system occurs. Thus, the corresponding braking signal 36 of the safety system in FIG. 5d remains flat and shows no signal. A comparison of FIGS. 4 and 5 makes clear that unnecessary activation of the safety system is avoided in the method of the present invention. By using two threshold values for the safety system, it is possible to set the third threshold value $n_{s2}$ at which unconditional activation of the safety system occurs to be higher than in conventional methods, where the threshold value $n_s$ for the activation of the safety system must be set lower. The possibility to set the third threshold value $n_{s2}$ higher than in conventional methods results immediately from the consideration that even in case that malfunctions occur in the control system, an earlier braking of the rotor is already ensured by the second threshold value $n_{s1}$. The third threshold value $n_{s2}$ can therefore be set higher than in conventional systems. In conventional systems, the threshold value for the intervention of the safety system is set comparatively lower than in the method of the present invention, because it has to be ensured that a braking procedure is initiated even in case of a breakdown of the control system. However, in the method of the present invention this is ensured by the lower one of the two threshold values of the safety system.

FIG. 6 shows the conventional method when there is a malfunction in the control system that leads to an increase of the rotational speed. In this situation, it was presumed that a malfunction 38 (FIG. 6b) in the control system occurs at the time $t_1$, so that no braking signal is emitted by the control system (FIG. 6c). Subsequently, the rotational speed 46 increases, the threshold value $n_s$ being exceeded at the time $t_3$ and the safety system being activated (FIG. 6d). In the safety system of the present invention according to FIG. 7, at the time $t_2$ the safety system detects that the rotational speed has increased and no braking signal 42 has been emitted by the control system (FIG. 7c). At the time $t_2$, the rotational speed 47 exceeds the second threshold value $n_{s1}$, which is lower than the threshold value $n_s$ of FIG. 6. Thus, the safety system emits the braking signal 40 at the time $t_2$, so that the rotational speed of the wind turbine takes the course shown by 47 (FIG. 7d). For comparison the course of the rotational speed 46 from FIG. 6 is also shown in FIG. 7a. The conventional safety system does not detect until the time $t_3$ that a threshold value $n_s$ has been exceeded, and emits the braking signal only at the time $t_3$. Thus, the rotational speed takes the course shown by 46. Due to the malfunction of the control system being recognized later ($t_3 > t_2$), the wind turbine was exposed to greater loads, because a greater rotational speed value 46 occurred than with the safety system of the present invention.

Figure 8:
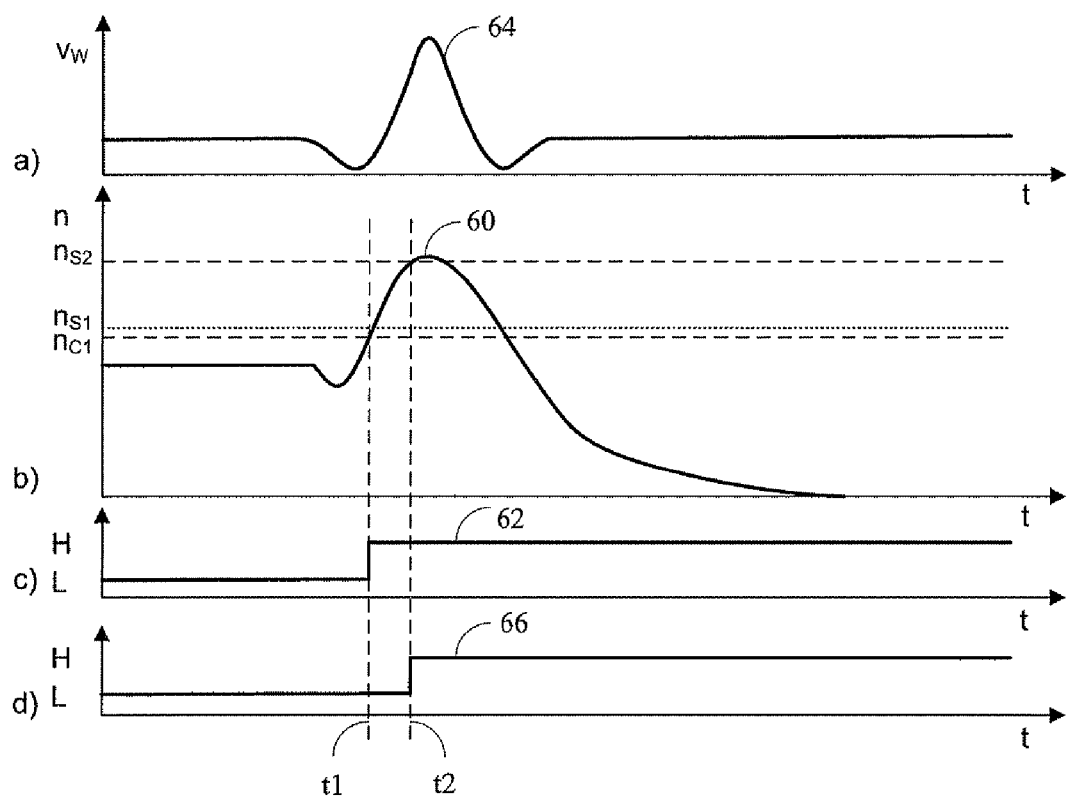
FIG. 8 shows the rotational speed plotted against time at an extreme wind speed with a recurrence period of 50 years when the safety system is activated in spite of a braking that was initiated by the control system.

FIG. 8 shows the course in time of the rotational speed 60 when there is a gust 64 that is stronger than an extreme wind speed with a recurrence period of 50 years. In this scenario, it was presumed that the control system works correctly, and thus it emits a voltage signal 62 when the first threshold value $n_a$ is exceeded at the time $t_1$ (FIG. 8c). Then the rotational speed 60 exceeds the second threshold value $n_{s1}$, and the safety system detects that a braking signal 62 has already been emitted and it does not initiate the braking procedure. Subsequently, the rotational speed 60 exceeds the third threshold value $n_{s2}$ of the safety system due to the gust 64 at the time $t_2$. At this time, the braking signal 66 of the safety system (FIG. 8d) is emitted in spite of the braking signal 62 already having been applied to the blade pitch control system. Thus, it can be made sure that the wind turbine has to be inspected after such a strong gust having occurred before it starts operation again.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for operating a wind turbine with a variable-speed rotor, a control system and a safety system, comprising the steps of:
    activating the safety system for braking the rotor when a rotational speed of the rotor exceeds either a second threshold value ($n_{s1}$) or a third threshold value ($n_{s2}$), the second threshold value ($n_{s1}$) being less than the third threshold value ($n_{s2}$),
    wherein when the rotational speed of the rotor exceeds the second threshold value ($n_{s1}$), the safety system is activated only if the control system has not initiated a control system braking procedure in response to the rotational speed of the rotor being greater than a first threshold value ($n_{c1}$) that is less than the second threshold value ($n_{s1}$); and
    wherein when the rotational speed of the rotor exceeds the third threshold value ($n_{s2}$), the safety system is activated even if the control system has initiated the control system braking procedure in response to the rotational speed of the rotor being greater than the first threshold value ($n_{c1}$).

2. The method according to claim 1, wherein the control system and the safety system trigger the blade pitch control system of at least one rotor blade for braking the rotor.

3. The method according to claim 1, wherein the control system reduces the rotational speed of the rotor for braking.

4. The method according to claim 1, wherein the safety system reduces the rotational speed of the rotor for braking.

5. The method according to claim 1, wherein after activation of the safety system, the wind turbine has to be checked for any damages occurred and the safety system has to be enabled before starting the operation of the wind turbine again.

6. A method for operating a wind turbine, the wind turbine comprising a rotor characterized by a rotational speed; a control system configured and arranged to compare the rotational speed to a first threshold value ($n_{c1}$), and to initiate a control system braking procedure of the rotor; and a safety system configured and arranged to compare the rotational speed to a second threshold value ($n_{s1}$) and to a third threshold value ($n_{s2}$), the second threshold value ($n_{s1}$) being greater than the first threshold value ($n_{c1}$) and less than the third threshold value ($n_{s2}$), and configured and arranged to initiate a safety system braking procedure of the rotor; the method comprising:
    comparing the rotational speed to the second threshold value ($n_{s1}$), wherein if the rotational speed is greater than the second threshold value ($n_{s1}$), the safety system checks whether the control system braking procedure was initiated in response to the rotational speed exceeding the first threshold value ($n_{c1}$), and then initiates the safety system braking procedure only if the control system braking procedure was not initiated.

7. The method of claim 6, wherein if the safety system did not initiate the safety system braking procedure in response to the rotational speed exceeding the second threshold value ($n_{s1}$), the method further comprises:
    comparing the rotational speed to the third threshold value ($n_{s2}$), wherein if the rotational speed exceeds the third threshold value ($n_{s2}$) the safety system initiates the safety system braking procedure.

8. The method of claim 6, wherein the safety system has logical priority over the control system.

9. The method of claim 6, wherein the first threshold value ($n_{c1}$) is a maximum rotational speed for the wind turbine.

10. A method for operating a wind turbine with a rotor, a control system and a safety system configured to initiate a safety system braking procedure, the method comprising the steps of:
  prompting the control system to initiate a control system braking procedure when a rotational speed of the rotor exceeds a first threshold value ($n_{c1}$), and
  activating the safety system when the rotational speed of the rotor exceeds a second threshold value ($n_{s1}$) wherein activating the safety system when the rotational speed of the rotor exceeds the second threshold value ($n_{s1}$) includes checking whether the control system braking procedure was initiated, and initiating the safety system braking procedure only if the control system braking procedure was not initiated.

11. The method according to claim 10, further comprising activating the safety system when the rotational speed of the rotor exceeds a third threshold value ($n_{s2}$) greater than the second threshold value ($n_{s1}$), wherein activating the safety system when the rotational speed of the rotor exceeds the third threshold value ($n_{s2}$) comprises initiating the safety system braking procedure even if the control system braking procedure was initiated.

12. The method according to claim 10, wherein the control system and the safety system trigger a blade pitch control system of at least one rotor blade for braking the rotor.

13. The method according to claim 10, wherein the control system reduces the rotational speed of the rotor for braking.

14. The method according to claim 10, wherein the safety system reduces the rotational speed of the rotor up to the standstill of the rotor for braking.

15. The method according to claim 10, wherein after an activation of the safety system, the wind turbine has to be checked for any damages occurred and the safety system has to be enabled before starting the operation of the wind turbine again.

* * * * *